July 24, 1962 J. R. SCANTLIN 3,046,526

SELECTOR APPARATUS

Filed Sept. 2, 1958 4 Sheets-Sheet 1

INVENTOR.
JOHN R. SCANTLIN

BY HIS ATTORNEYS.
HARRIS, KIECH, FOSTER & HARRIS

INVENTOR.
JOHN R. SCANTLIN

BY HIS ATTORNEYS.
HARRIS, KIECH, FOSTER & HARRIS

INVENTOR.
JOHN R. SCANTLIN

BY HIS ATTORNEYS.
HARRIS, KIECH, FOSTER & HARRIS

July 24, 1962 J. R. SCANTLIN 3,046,526

SELECTOR APPARATUS

Filed Sept. 2, 1958 4 Sheets-Sheet 4

INVENTOR.
JOHN R. SCANTLIN

BY HIS ATTORNEYS.
HARRIS, KIECH, FOSTER & HARRIS

United States Patent Office 3,046,526
Patented July 24, 1962

3,046,526
SELECTOR APPARATUS
John R. Scantlin, Los Angeles, Calif., assignor to Scantlin Electronics, Inc., a corporation of Delaware
Filed Sept. 2, 1958, Ser. No. 759,837
17 Claims. (Cl. 340—164)

This invention relates to selector apparatus for producing an output indication when a particular code is applied to the apparatus as an input. The invention is especially adapted for use with mobile telephones and the like but is not intended to be so limited.

This application is a continuation-in-part of my copending application entitled "Selector Apparatus," Serial No. 687,320, filed September 30, 1957, now abandoned.

A code consists of a series of digits or groups of signals and present-day selector equipment using five digit codes permits the use of approximately four thousand different codes or stations. This figure presents a severe limitation on the application of such equipment and it is an object of the invention to provide a marked increase in the number of codes useable. A further object is to provide equipment which will provide for over fifty thousand codes or numbers in a five digit code and over four million in a seven digit code. Another object of the invention is to provide such selector equipment which is compatible with and directly interchangeable with certain present-day selector equipment used in conventional mobile telephones and the like. Another object of the invention is to provide such equipment which places no limitation on the sum of the numbers comprising the digits of the code.

It is another object of the invention to provide selector apparatus for use with codes appearing in the form of a series of groups of pulses, which apparatus includes two counting devices operated in parallel with all of the pulses fed to one counting device and a pulse representing each group of pulses fed to the second counting device, with the outputs of the counting devices coupled to a plurality of output lines in a counter output circuit providing outputs when particular predetermined combinations of counts exist. A further object of the invention is to provide such apparatus with means for resetting the counting devices when an undesired number combination is received. Another object of the invention is to provide such apparatus in which the incoming pulses serve as the reset pulses with the apparatus determining whether or not such reset pulses will be coupled to the counting devices.

It is an object of the invention to provide a counter output circuit for a selector apparatus having a plurality of and gates for coupling the outputs of preselected counting devices to particular output lines for controlling the voltage level of the output lines as a function of the states of the counting devices. Another object of the invention is to provide an alternative form of a counter output circuit having a voltage adding circuit for connecting the outputs of the preselected counting devices to the output line. Another object is to provide such a counter output circuit wherein resistors are connected in series between the outputs of the counting devices and the output line with the resistors functioning as voltage dividers for varying the voltage levels of the output lines. It is another object of the invention to provide circuitry for use with the and gate counter output circuit and the resistor counter output circuit so that the two types of circuits may be used interchangeably with other units of the selector apparatus.

It is a further object of the invention to provide a selector apparatus of the type referred to above which can accept the audio frequency tone changes of a conventional mobile telephone system for energizing the counting devices in the apparatus. A further object of the invention is to provide a selector apparatus using a plurality of binary counting units with particular outputs of each of the counting units connected in parallel to a plurality of output lines to form a plurality of and gates, the particular interconnections being made by diode rectifiers to define the particular code to which each selector apparatus will be responsive. Another object of the invention is to provide such an apparatus in which the plurality of and gates are connected in parallel to an or gate for blocking the reset pulse generated with each incoming digit group when the preceding digit group corresponds to the predetermined code of the particular selector apparatus. A still further object of the invention is to provide such a selector apparatus having novel and unusual pulse forming circuits. A further object of the invention is to provide a selector apparatus in which voltage adding circuits utilizing resistors may be substituted for the and gates utilizing rectifiers without affecting the operation of the equipment.

It is a further object of the invention to provide such a selector apparatus which is suitable for the application of transistors and one which is small, compact, rugged, and with low power requirements. A further object is to provide such an apparatus which has no critical adjustments or conditions and one in which the transistors, vacuum tubes, or other devices are operated only at the saturated and cut-off conditions, hence eliminating any problems with regulated power sources and the like.

The invention also comprises novel details of construction and novel combinations and arrangements of parts, which will more fully appear in the course of the following description. The drawings merely show and the description merely describes a preferred embodiment of the present invention which is given by way of illustration or example.

Figure 2:
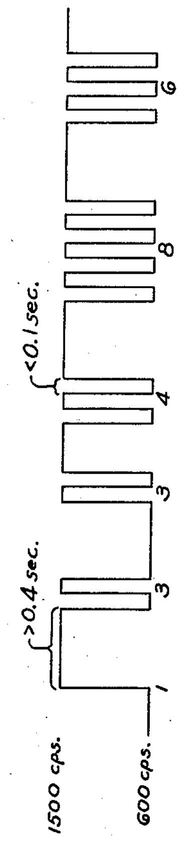
FIG. 2 illustrates the type of signal received with certain present-day mobile telephone systems with which the invention is useable.

FIG. 2 illustrates the code used generally throughout this country with present-day mobile telephone systems. The first portion of the embodiment of the invention illustrated herein serves to convert the signal of FIG. 2 to a form suitable for driving the pair of counters used in the selector apparatus. Of course, the selector apparatus of the invention can be used with other types of signals by providing suitable signal conversion circuitry in the initial portion of the apparatus.

The code of FIG. 2 comprises a series of groups of tone changes where each group corresponds to a digit of the code and each tone change corresponds to one count in the digit. In present-day equipment, the tone change is between two audio frequencies of six-hundred and fifteen hundred cycles per second with a time interval of approximately one tenth of a second between changes of a digit and a time interval of greater than four tenths of a second between digits or groups of changes. These parameters are arbitrary and have been chosen to provide a practical system. The time constants and other characteristics of the apparatus of the invention are selected with relation to the parameters of the incoming signal and would be changed when the invention is used with other signal sources.

FIG. 2 represents the particular code for calling a station identified by the number 33486, the code comprising five digits or groups of tone changes preceded by a single tone change. This single tone change or one precedes all numbers and serves to reset or ready the selector apparatus and comprises part of the present day mobile telephone equipment.

Figure 1:
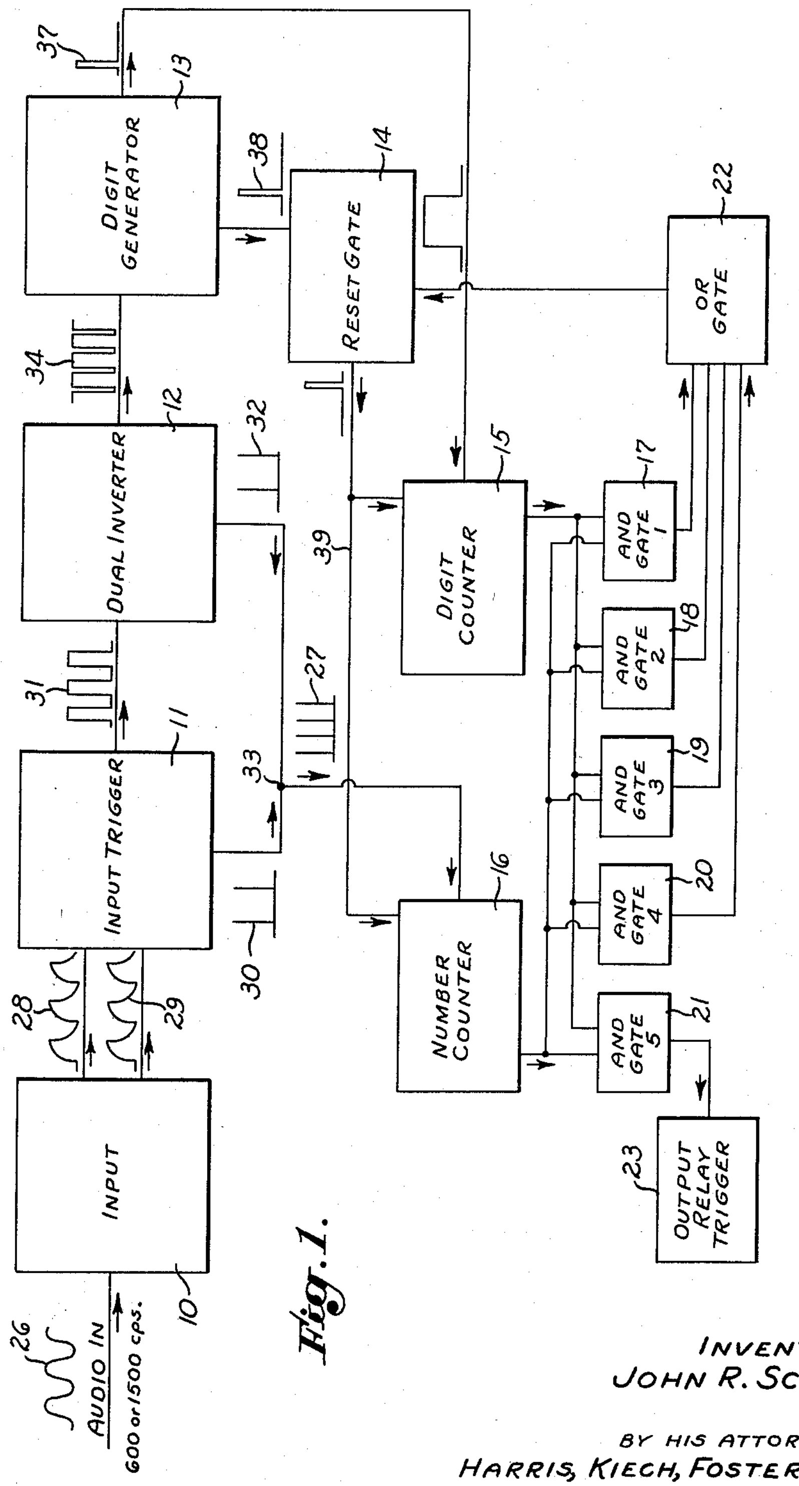
FIG. 1 is a block diagram illustrating the operation of a preferred embodiment of the invention.

FIG. 1 shows the invention in block diagram form including an input circuit 10, an input trigger 11, a dual inverter 12, a digit generator 13, a reset gate 14, a digit counter 15, a number counter 16, a counter output circuit comprising a group of and gates 17, 18, 19, 20, 21, an or gate 22, and an output relay trigger 23.

The input circuit 10, input trigger 11, and dual inverter 12 comprise a circuit for converting the audio tone changes into pulses for driving the counters. The wave form of the input audio tones are indicated at 26 and one of the outputs, consisting of a pulse for each tone change, is indicated at 27. In this particular circuit, the input 10 produces two similar outputs 28, 29, one output going positive from ground while the second goes negative from ground. The input trigger provides a first output 30 consisting of a pulse for every other tone change, and a second output 31 which is a square wave with a voltage change for each tone change. The dual inverter 12 provides a first output 32 consisting of a pulse for every other tone change such that when the outputs 30 and 32 are combined at 33, the signal indicated at 27 consisting of a pulse for each tone change is produced. This signal is then coupled to the number counter 16 as the input. The dual inverter also produces a second output 34 which is a pulse for each tone change.

The digit counter 15 advances one count per digit or group of pulses. The digit generator 13 provides an output 37 consisting of a single pulse for the first tone change of each group of tone changes, this output being connected to the digit counter as an input. A similar output 38 is connected to the reset gate 14. Of course, it is not necessary to obtain this pulse from the first tone change, but only to obtain one pulse for each group of pulses.

Means are provided for resetting the counters 15, 16 to the zero or initial condition when desired. In this embodiment, the output 38 of the digit generator is passed through the reset gate 14 when the gate is open to a reset line 39 which is connected to each of the counters. By this means, the counters are reset by the first pulse or tone change of each digit group when the gate is open. Succeeding pulses of a digit group will advance the number counter, but the digit counter will not be advanced when the reset gate is open because the digit generator 13 delivers only one pulse per group of tone changes.

The outputs of the counters are connected in parallel to each of the and gates 17–21 of the counter output circuit. An and gate is a circuit which produces an output signal when there is a signal on each of its inputs. Each and gate is connected to the counter outputs in such a manner that there is an output signal from the and gate only when each of the counters is in a particular count state. In this embodiment utilizing the five digit code of FIG. 2, and gate 1 provides an output signal only when the digit counter 15 is in the count state corresponding to the first digit and number counter 16 is in the count state corresponding to the first digit. Similarly, and gate 2 provides an output signal only when the digit counter is in the count state corresponding to the second digit and the number counter is in the count state corresponding to the second digit.

The output signals of the first four and gates 17–20 are connected to the or gate 22 as inputs. An or gate is a circuit which provides an output signal when there is a signal at any one of its inputs. The or gate 22 is connected to the reset gate 14 in controlling relationship, such that when there is an output signal from the or gate, the reset gate will be closed, blocking the reset action of the output 38 from the digit generator. The output from the fifth and gate 21 is connected to the output relay trigger 23, this being the desired output indication of the selector apparatus. The output signal from the and gate 5 can be used to drive any type of indicating apparatus and in this particular embodiment, is used to energize a relay.

When the code of FIG. 2 is received by the apparatus of FIG. 1, the reset or ready signal indicated by the first numeral 1 will provide a single pulse to the number counter input, to the digit counter input, and to the reset line, thereby moving both counters to the zero condition. Then the first tone change of the first digit 3 will similarly provide a pulse to the number counter, the digit counter, and the reset line, again resetting both counters to the zero condition. The second and third tone changes of the first digit group will advance the number counter two counts.

If the selector apparatus of FIG. 1 is connected to select a code the first digit of which is 3, gate 1 will provide an output signal which energizes the or gate and blocks the reset gate. Then the first tone change of the next digit group will provide a pulse to the number counter and a pulse to the digit counter but no pulse to the reset line. Both counters will advance and if this particular apparatus is also connected to select a code having the numeral 3 as a second digit, and gate 2 will provide an output signal which energizes the or gate and maintains the reset gate blocked. The third and fourth digits will operate in the same manner if this apparatus is connected to select this particular code. After the fifth digit has been received and counted, and gate 5 will provide an output signal to the output relay trigger which provides an indication that the particular code for which this apparatus is connected has been received. The output of and gate 5 is not connected to the or gate and, therefore, the reset gate will be open for the next incoming pulse, thereby resetting the counters to the zero condition.

If the particular apparatus being considered is not connected for a code having the number 3 as the first digit thereof, there will be no output from and gate 1 following receipt of the group of pulses corresponding to the first digit of the code. Also there will be no output from the other and gates since they are set for other digits of the code. Then the reset gate will be open and the output 38 from the digit generator produced by the first pulse or tone change of the next digit group will reset both counters to the zero condition, thereby preventing any output indication at the output relay trigger. If the selector was set for the code 33426, and code 33486 was received, the reset gate would be maintained closed following receipt of the 3, the 3, and the 4, but following receipt of the 8, the gate would be opened, permitting resetting of the counters with the first pulse of the 6.

Figure 3:
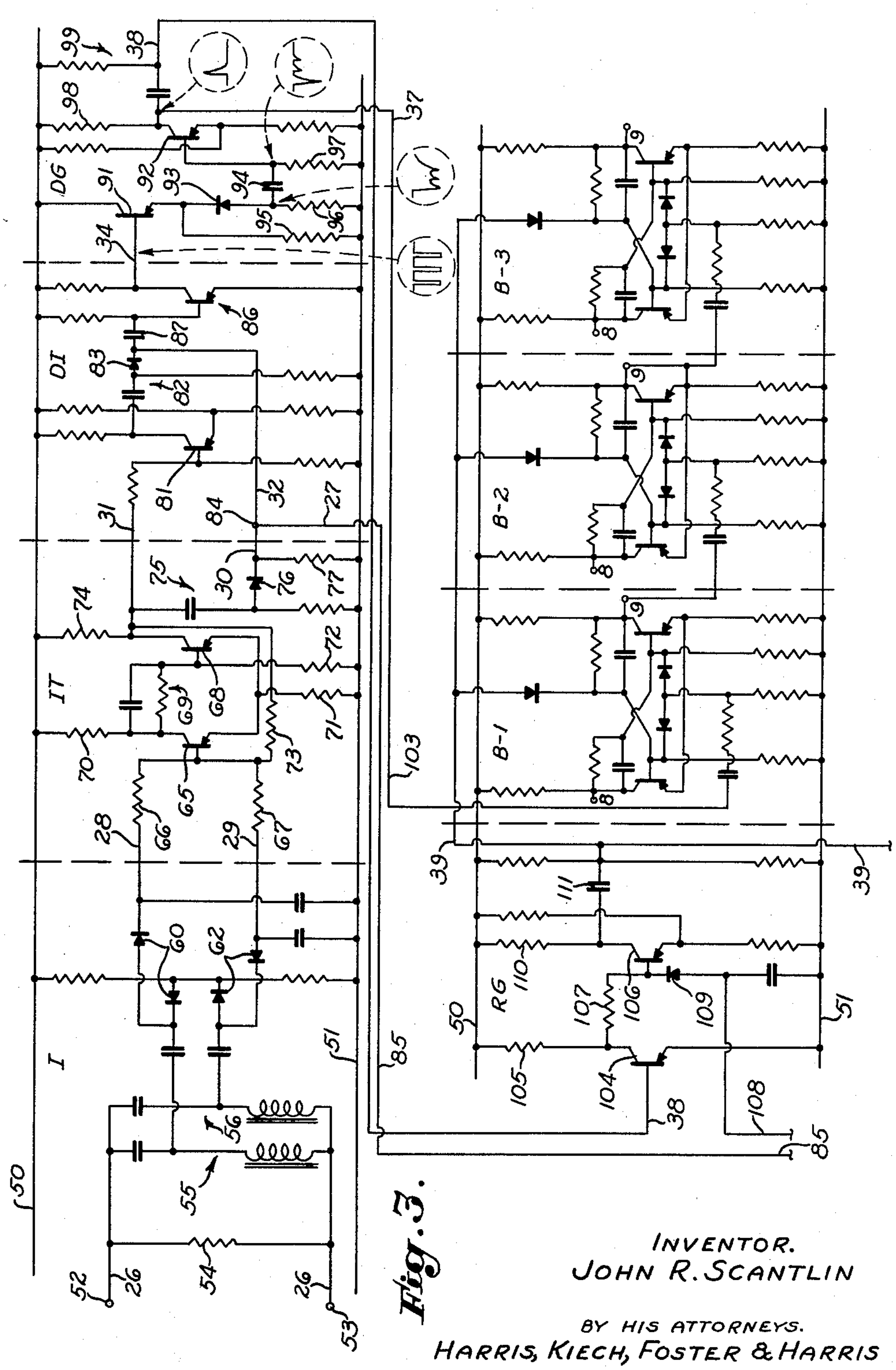
FIG. 3 is a portion of a schematic diagram of an embodiment of the invention.
Figure 4:
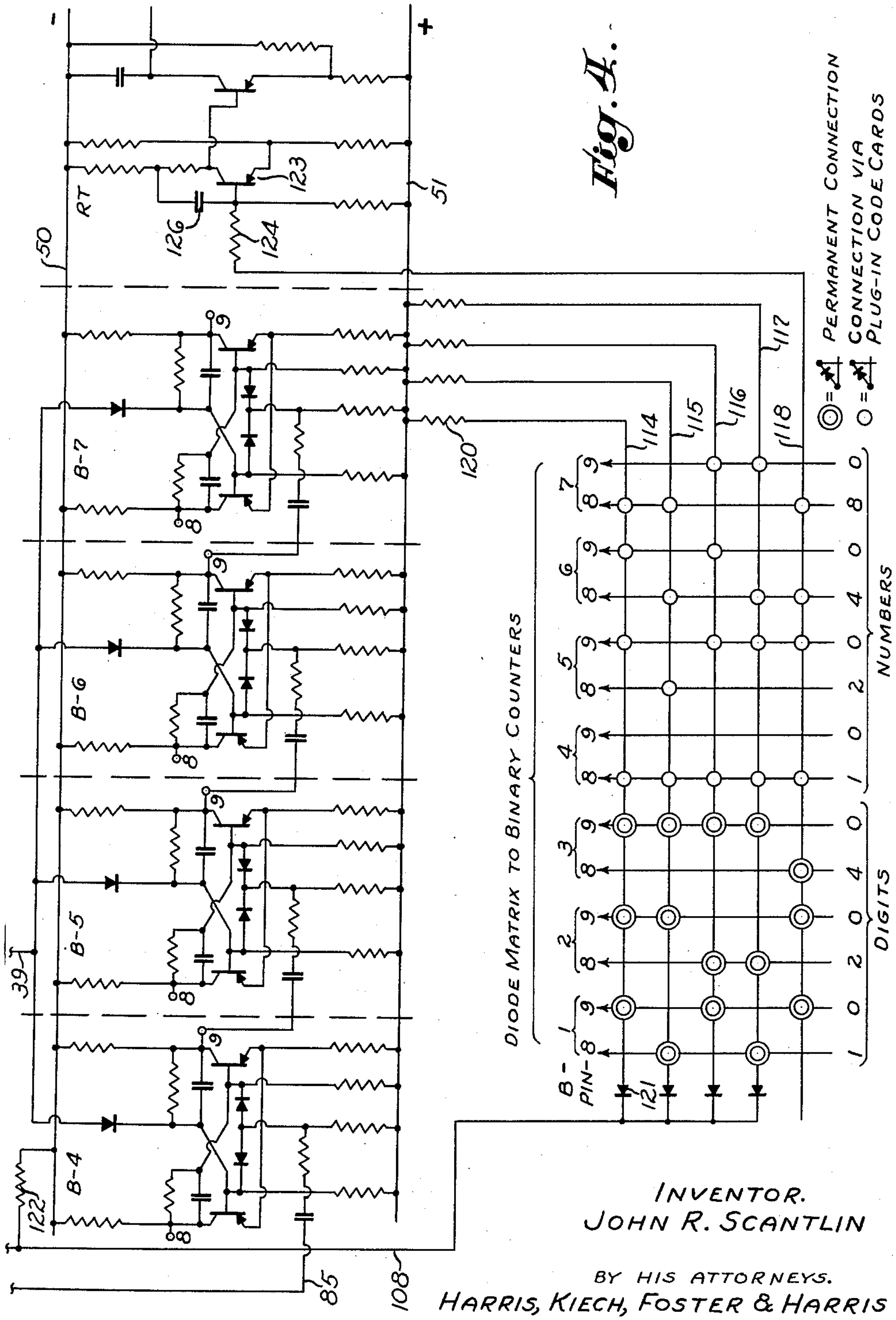
FIG. 4 is the remainder of the schematic of FIG. 3.

FIGS. 3 and 4 show the circuit of a selector apparatus constructed according to the block diagram of FIG. 1. The vertical dashed lines divide the schematic into units corresponding to the blocks of FIG. 1 with the points at which the wave forms of FIG. 1 appear being indicated by the corresponding numeral. The power supply for the equipment is furnished through a negative line 50 and a positive line 51, corresponding lines being identified by the same reference numerals on FIGS. 3 and 4.

The audio tones are coupled to terminals 52, 53 of the input circuit I across resistor 54. The outputs from two series-resonant circuits 55, 56 are rectified by full-wave rectifiers 60, 62.

The outputs 28, 29 of the rectifiers 60, 62 are connected to the base of a transistor 65 of the input trigger IT through resistors 66, 67, respectively. The collector of transistor 65 is connected to the base of a transistor 68 through a parallel R-C circuit 69 and to the negative line 50 through a load resistor 70. The emitters of both transistors are connected to the positive line through a common resistor 71 and the base of the transistor 68 is connected to the positive line through a resistor 72, the base of the transistor 65 being connected to the collector of transistor 68 through another resistor 73.

The output 31 of the input trigger appears at the collector of the transistor 68 which is connected to the negative line through load resistor 74. This output 31 is developed across a series C-R circuit 75 with a rectifier 76 and resistor 77 coupling the C-R junction to the positive line, the output 30 consisting of pulses for each positive-going change of the output 31 being developed at the rectifier.

The output 31 of the input trigger IT is inverted in the dual inverter DI with a transistor 81 operated as a conventional pulse inverter. The collector of the transistor 81 is connected to a series C-R circuit 82 and rectifier 83 which in turn is connected to the resistor 77, the circuit 82 and rectifier 83 functioning in the same manner as the circuit 75 and rectifier 76 to provide the output 32 consisting of pulses for each positive-going change of the now inverted signal 31. The outputs 30 and 32 are combined at junction 84 to provide the output 27 which is connected to the number counter B–4 through B–7 of FIG. 4 by line 85. The junction 84 is connected to another transistor 86 through capacitor 87, this transistor also being operated in a pulse inverting circuit to provide the output 34 of the dual inverter DI.

In the digit generator DG, the output 34 of the dual inverter is connected directly to the base of a transistor 91 whose collector is connected directly to the negative line. The emitter of the transistor 91 is connected to the base of a transistor 92 through a rectifier 93 and a capacitor 94, the emitter also being connected to the positive line through resistor 95. The junction of the rectifier 93 and capacitor 94 is connected to the positive line through resistor 96 and the base of transistor 92 is connected to the positive line through resistor 97, the emitter of transistor 92 being connected to the junction of a resistance voltage divider and the collector being connected to the negative line through load resistor 98. The output 37 is developed at the collector of transistor 92 and the output 38 is developed across an R-C circuit 99.

The wave forms occurring at different points in the digit generator are shown in the small circles to aid understanding the operation of the circuit. The diode 93 blocks leakage current through the transistor 91 so that the characteristics of the transistor are not critical to the operation of the circuit. Preferably the rectifier 93 is a crystal diode having high back resistance. The capacitor 94 and resistor 96 comprise a first R–C circuit having a relatively long time constant and the capacitor 94 and the resistor 97 comprise a second R–C circuit having a relatively short time constant. This circuit permits the use of a single capacitor to obtain both time constants and further permits the capacitor to be of a relatively low value while the resistor 96 can be a relatively high value. For example, in one embodiment of the circuit, the resistor 95 is 1,000 ohms, 96 is 2.2 megohms and 97 is 220 ohms while the capacitor 94 is 0.1 microfarad, making the first time constant approximately two-tenths of a second and the second time constant approximately 20 microseconds.

The output 37 of the digit generator is connected to the digit counter B–1, B–2, B–3 by the line 103 and the output 38 is connected to the base of a transistor 104 of the reset gate RG. The emitter of transistor 104 is connected directly to the positive line and the collector is connected to the negative line through load resistor 105 and to the base of a transistor 106 through coupling resistor 107. The output from the or gate is connected to the base of a transistor 106 via line 108 and rectifier 109. The collector of the transistor 106 is connected to the negative line through resistor 110 and to the reset line 39 through capacitor 111, the emitter being connected to the junction of a resistance voltage divider.

In the preferred embodiment of the invention illustrated herein, the digit counter comprises three binary counters B–1, B–2, B–3, connected in a chain. The particular number of binary counters utilized in the chain is dependent upon the number of digits in the code, the five digit code requiring three binary units for counting up to five. The binary units are identical and are conventional in design, each utilizing two transistors. The collector of the first transistor of each binary counter is identified by a terminal 8 and the collector of the second transistor of each binary counter is identified by a terminal 9, the outputs of the counter appearing at the terminals.

The number counter comprises four binary counters B–4, B–5, B–6, B–7 connected in a chain, four binary counters being required since the number counter must count to ten. These binary counters are identical in all respects to the binary counters of the digit counter.

A diode matrix which serves as the end gates of FIG. 1 is shown schematically in FIG. 4. The vertical lines indicate direct wire connections to the outputs of the binary counters, each vertical line being identified by binary counter number and pin or terminal number. A plurality of output lines 114, 115, 116, 117, 118 are provided, one line corresponding to each digit of the code. Output line 114 is connected in series with resistor 120 and rectifier 121 between the positive line 51 and line 108, the latter being connected to the negative line through resistor 122. Output lines 115, 116 and 117 are similarly connected between lines 51 and 108. Output line 118 is connected to the base of transistor 123 in the relay trigger RT through resistor 124.

The circles on the diode matrix of FIG. 4 indicate rectifier connections between the lines intersecting within the circles, as indicated at the right of the matrix. The double line circles indicate permanent connections and the single line circles indicate connections which can be changed to change the particular code to which the particular apparatus will be responsive.

Each of the output lines with its associated rectifiers in the matrix comprises an and gate. If no rectifier is connected, line 114 will have a particular potential which will be the signal condition and which will be relatively positive in this embodiment. With the rectifiers connected as shown in the matrix diagram, the line will have this positive or signal condition only when none of the rectifiers are conducting, i.e., only when all of the connected counter outputs are positive relative to the output line, which occurs when all of the connected transistors are conducting. If one connected transistor is not conducting, the terminal will be negative and the rectifier will conduct through the load resistor of the transistor, causing the output line to go negative to the no-signal condition. Thus when the binary counters of the digit counter and of the number counter are each in particular count states, the output line will be in the signal condition and for all other count states of the counters, the output line will be in the no-signal condition. The cathodes of the rectifiers 121 associated with the output lines 114, 115, 116, 117 are connected together, forming an or gate for coupling the signal or positive condition of one or more of the output lines to the reset gate via line 108. When there is a signal or positive condition on the line 108, the reset gate will be closed blocking the output 38 of the digit generator from the reset line 39.

Each of the output lines 114–118 can be set for predetermined digit counter and number counter conditions and, in the embodiment shown in FIG. 4, the selector apparatus is connected to respond to the code 06248. Remembering that the first pulse of the first digit group is blanked by the reset operation, the rectifiers are connected to output line 114 to produce the signal condition when the digit counter is in the zero count state and the number counter is in the 9 count state. Similarly, line 115 is connected for the digit counter in the 1 count state and the number counter in the 15 count state, line 116 for the digit counter in the 2 count state and the number counter in the 17 or 1 count state (17 minus 16 equals 1, the number counter recycling at 16), line 117 with the digit counter in the 3 count state and the number counter in the 21 or 5 count state, and line 118 with the digit counter in the 4 count state and the number counter in the 29 or 13 count state. Then when a code having the number 0 (i.e., 10) as the first digit is received, a signal will be provided on the line 114 and the reset gate will be closed. If the second number of the received code is 6, the line 115 will be in the signal condition and the reset gate will be maintained closed. The operation will be similar if the third and fourth digits are the numbers 2 and 4 respectively. Then if the fifth digit is the number 8, the line 118 will be moved to the signal or positive condition, which potential change is amplified in the relay trigger RT for energizing a relay or similar indicator. A time delay capacitor 126 is connected between the base and the load resistor of the transistor 123 to prevent actuation of the relay trigger until the signal condition exists on line 118 for more than four-tenths of a second. This prevents an output indication from occurring during the counting operation. For example, if the particular selector apparatus is set for the code 06248 and the code 06249 is being received, the apparatus would be in the 06248 condition for the period between the eighth and ninth pulse of the fifth digit which would produce a signal condition on the line 118 for that period.

Since the output line 118 is not connected to the reset gate through the or gate, the first pulse received following the fifth digit will cause resetting of the apparatus.

When the number of a digit of a code being received does not correspond to a number of the code for which the apparatus is set, none of the output lines will be in the signal condition and, therefore, the apparatus will be reset upon receipt of the first pulse of the next digit. Thus, the selector apparatus will provide an output indication only when one particular code is received.

The selector apparatus of the invention will select one five-digit number from over fifty thousand such numbers which is a tremendous advance over the previously used selector apparatus which would operate with a maximum of four thousand five-digit numbers. It should be noted that the selector apparatus of the invention can be utilized with any quantity of numbers by suitably selecting the number of digits and the number of counts per digit and providing a digit counter and a number counter which will count the selected number of digits and selected number of counts per digit. The particular circuit shown in FIGS. 3 and 4 can be modified for use with four million numbers by merely adding two more output lines in the diode matrix similar to the output lines 114–117, since the digit counter will handle seven digits. Similarly, if a one to sixteen count were used for each digit rather than a one to ten count as is customary, the circuit would handle fifteen to the seventh power seven digit codes.

Codes which contain the digit one are not used in present-day mobile telephone equipment because the initial one is used to reset the equipment. Since the subject apparatus resets following each wrong digit received as well as following the fifth digit of the particular code to which the apparatus is set, many codes containing the number one also are useable if desired.

Figure 5:
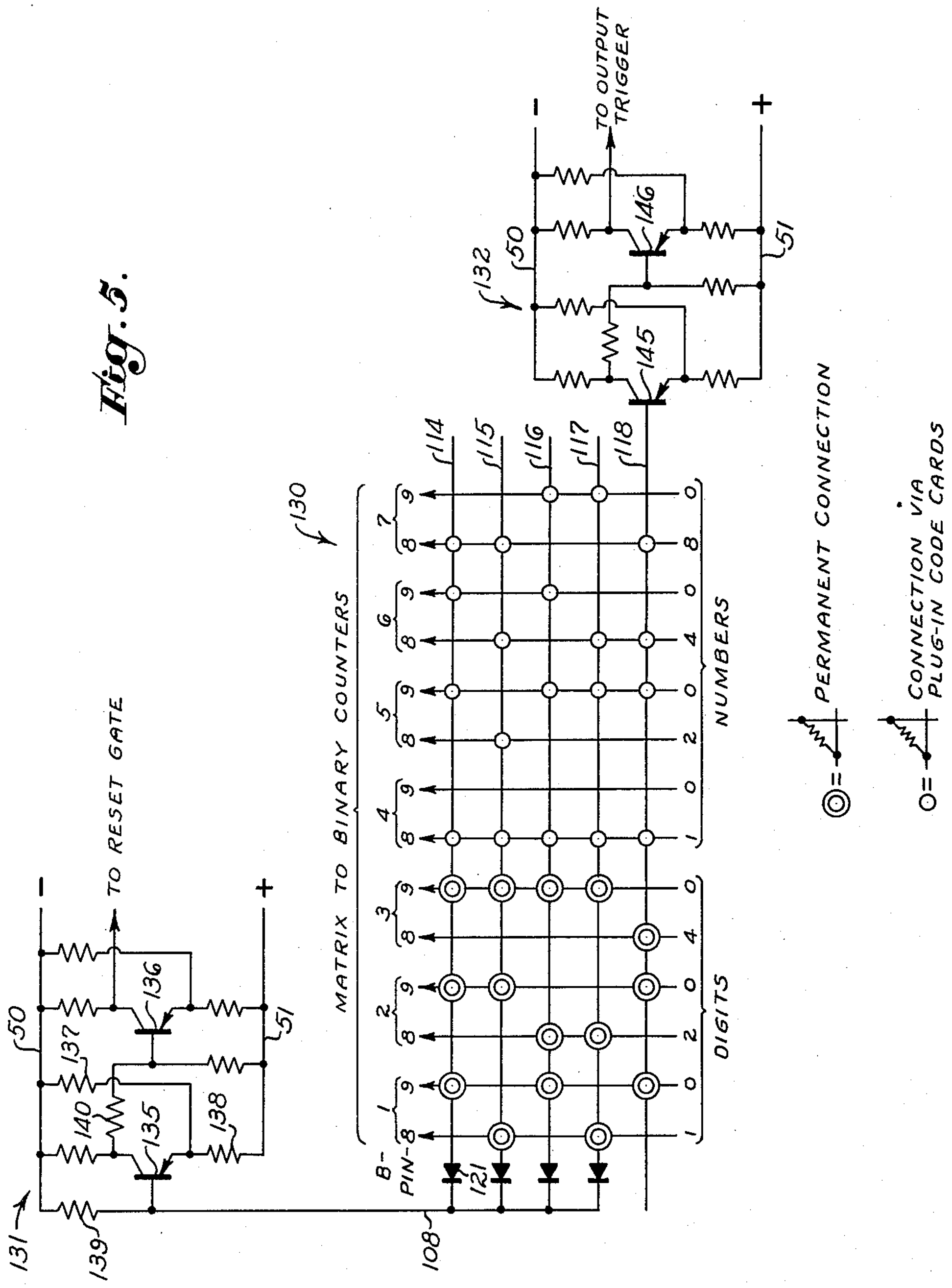
FIG. 5 is a schematic diagram of an alternative embodiment of a portion of the diagram of FIG. 4.

An alternative form of the counter output circuit which does not utilize and gates and diode rectifiers is shown in FIG. 5. This alternative form includes a matrix 130 similar to the diode matrix of FIG. 4, and amplifiers 131, 132 which permit the embodiment of FIG. 5 to be directly substituted for the matrix of FIG. 4. The resistor 122 and the resistors 120 of the circuit of FIG. 4 are not used with the circuit of FIG. 5.

The matrix 130 of FIG. 5 is identical to the matrix of FIG. 4 with the exception that resistors are substituted for the rectifiers. The circles on the matrix indicate resistor connections between the lines intersecting within the circles, as indicated below the matrix. The double line circles indicate permanent connections and the single line circles indicate connections which can be changed to change the particular code to which the particular selector apparatus will be responsive.

Each of the output lines with its associated resistors comprises a voltage adding circuit. A resistor is connected between the line 114 and the collector of a transistor in each of the binary counters. When all of the connected transistors are conducting, which is the correct number condition, all of the collectors and also the line 114 will be at a potential near that of the positive line 51. Conversely, when all of the connected transistors are not conducting, the line 114 will be at a potential near that of the negative line 50. When some of the connected transistors are conducting and others are not, the resistors associated with the line 114 will function as a voltage divider between the potential of the conducting transistor collectors and the potential of the nonconducting transistor collectors with the line 114 being at a potential intermediate the previously referred to high and low potentials.

As with the diode matrix, the particular transistor to which an output line is connected in each binary counter determines one digit of the code which the selector apparatus will select. Referring again to the output line 114, when the correct number for this line has been received, all of the connected transistors will be conducting and the line will be at a particular potential. If any one of the connected transistors is not conducting, the potential of the line 114 will be changed by an amount determined by the ratio of the resistors. If two connected transistors are not conducting, the potential will be changed by a greater amount, again determined by the resistor ratio. A wrong number exists when one or more of the connected transistors are not conducting. The other output lines 115, 116, 117 and 118 are connected and operated in the same manner as the line 114. When an output line is at the potential, near that of the positive line, produced with all connetced transistors conducting, the output line is in the signal condition referred to in the discussion of the matrix of FIG. 4. The stepwise changes in potential of the output line in the negative direction resulting from nonconduction of one or more of the connected transistors correspond to the no-signal condition of the matrix of FIG. 4.

The output lines 114, 115, 116 and 117 are connected to the cathodes of the corresponding rectifiers 121 of the or gate as in the embodiment of FIG. 4 and the output of the or gate is connected via the line 108 to the input of the amplifier 131. The remaining output line 118 is connected to the input of the amplifier 132. The resistor matrix of FIG. 5 ordinarily will have a higher impedance, a lower power output and a smaller voltage change between the signal and no-signal condition than the matrix of FIG. 4. The amplifiers 131 and 132 are used to permit direct substitution of one matrix for the other.

The amplifier 131 is a two-stage amplifier utilizing transistors 135, 136. Resistors 137, 138 are connected as a voltage divider across the lines 50, 51 to provide a bias for the transistor 135. The transistor 135 is maintained in full conduction by current through a resistor 139 except when one or more of the output lines 114, 115, 116, 117 are in the signal condition. The potential of such an output line is coupled to the transistor base through the or gate and decreases the base-emitter potential to a cut off condition. The collector of the transistor 135 is connected to the base of the transistor 136 through a resistor 140 so that when the transistor 135 is cut off, the transistor 136 is switched to full conduction. Then the potential of the collector of the transistor 136 changes in a positive direction resulting in closing of the reset gate and the blocking of the output 38 of the digit generator from the reset line 39.

The amplifier 132 is similar to the amplifier 131, utilizing transistors 145 and 146. The transistor 145 is biased for full conduction for any no-signal state of the output line 118 while the transistor 146 is cut off. When the potential of the output line 118 goes to the value near that of the positive line 51 corresponding to the signal condition, the transistor 145 will be cut off and the transistor 146 will go into full conduction, providing the desired voltage change for coupling to the output trigger 23.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a selector apparatus for operation from a series of groups of tone changes, the combination of: an input circuit for producing a series of groups of pulses corresponding to the tone changes of the input; a digit generator circuit for producing a series of pulses corresponding to each of the groups; a digit counter for counting the pulse output of said digit generator circuit; a number counter for counting the pulse output of said input circuit; means for coupling said pulse output of said digit generator circuit to said digit counter; means for coupling said pulse output of said input circuit to said number counter; a counter output circuit for producing an output signal whenever said digit counter and said number counter have counted to any one of a series of predetermined number combinations, with the series of predetermined number combinations corresponding to the item to be selected; means for coupling the outputs of said counters to said counter output circuit in parallel; a reset circuit for coupling said pulse output of said digit generator circuit to both of said counters for resetting said counters to the zero condition in the absence of an output signal from said counter output circuit; and means for coupling the output of said counter output circuit to said reset circuit.

2. In a selector apparatus for operation with a code having a series of groups of code signals, the combination of: group means for producing a series of group signals corresponding to each of the groups of the code; first signal counting means; second signal counting means; means for coupling the code to said first signal counting means as an input for counting code signals consecutively; means for coupling the series of signals from said group means to said second signal counting means as an input for counting group signals consecutively; a plurality of means for combining the outputs of said first and second signal counting means to produce a control signal after termination of each group, when a predetermined code is used as an input; and means for resetting each of said signal counting means to the zero condition on receipt of a signal group of the code except when a control signal has been produced with the preceding signal group, with both of said counting means continuing to count consecutively when the incoming code groups correspond to the predetermined code.

3. In a selector apparatus for operation with a code having a series of groups of code signals, the combination of: group means for producing a series of groups signals corresponding to the first signal of each of the groups of the code; first signal counting means; second signal counting means; means for coupling the code to said first signal counting means as an input for counting code signals consecutively; means for coupling the series of signals from said group means to said second signal counting means as an input for counting group signals consecutively; a plurality of means for combining the outputs of said first and second signal counting means to produce a control signal after termination of each group when a predetermined code is used as an input; and means for resetting each of said signal counting means to the zero condition on receipt of a signal group of the code except when a control signal has been produced with the preceding signal group, with both of said counting means continuing to count consecutively when the incoming code groups correspond to the predetermined code.

4. In a station selector apparatus for producing an output indication when a predetermined code is coupled thereto as an input, the code comprising $n$ digit groups in which each digit is represented by one or more pulses, with $n$ greater than 1 the combination of: pulse generator means for producing a series of pulses corresponding to each of the digit groups of the code; a digit counter for counting the pulse output of said pulse generator means; a number counter for counting the pulses of the code; a counter output circuit for producing an output signal whenever said digit counter and number counter have counted to any one of a series of predetermined number combinations, with the series of predetermined number combinations corresponding to the $n$ digits of the predetermined code; a reset circuit for coupling said pulse output of said pulse generator means to both of said counters for resetting said counters to the zero condition in the absence of an output signal from said counter output circuit for the first $n-1$ digit groups of the predetermined code received; and an indicator circuit for producing the output indication when said counter output circuit produces an output signal for the $n$th digit group of the predetermined code.

5. In a station selector apparatus for producing an output indication when a predetermined code is coupled thereto as an input, the code comprising $n$ digit groups in which each digit is represented by one or more pulses, with $n$ greater than 1 the combination of: pulse generator means for producing a series of pulses corresponding to each of the digit groups of the code; a digit counter for counting the pulse output of said pulse generator means; a number counter for counting the pulses of the code; a counter output circuit for producing an output signal whenever said digit counter and number counter have counted to any one of a series of predetermined number combinations, with the series of predetermined number combinations corresponding to the $n$ digits of the predetermined code; a reset circuit for resetting said counters to the zero condition in the absence of an output signal from said counter output circuit for the first $n-1$ digit groups of the predetermined code received; and an indicator circuit for producing the output indication when said counter output circuit produces an output signal for the $n$th digit group of the predetermined code.

6. In a station selector apparatus for producing an output indication when a predetermined code is coupled thereto as an input, the code comprising $n$ digit groups in which each digit is represented by one or more signals, the combination of: a first counting device producing an output indicative of the number of input signals received; a second counting device producing an output indicative of the number of input signals received; a reset line coupled to each of said counting devices for setting to the zero condition; first circuit means for coupling a signal representing each of the digit groups of the code to said first counting device as an input; second circuit means for coupling the code to said second counting device as an input; and reset means for driving said reset line to reset each of said counting devices to zero after receipt of each digit group of a code except when the predetermined code is coupled to said counting devices, said reset means including $n$ and gates driven by the outputs of said counting devices, one of said and gates corresponding to each of the digit groups of the predetermined code respectively, each and gate producing an output when a predetermined digit group of the code contains a predetermined number of signals, and an or gate driven by the outputs of the first $n-1$ and gates with the output of said or gate preventing driving of said reset line, the output of the $n$th and gate producing the desired output indication.

7. In a station selector apparatus for producing an output indication when a predetermined code is coupled thereto as an input, the code comprising $n$ digit groups in which each digit is represented by one or more signals, the combination of: a first counting device producing an output indicative of the number of input signals received; a second counting device producing an output indicative of the number of input signals received; a reset line coupled to each of said counting devices for setting to the zero condition; first circuit means for coupling the first signal of each of the digit groups of the code to said first counting device as an input; second circuit means for coupling the code to said second counting device as an input; and reset means for driving said reset line to reset each of said counting devices to zero after receipt of each digit group of a code except when the predetermined code is coupled to said counting devices, said reset means including $n$ and gates driven by the outputs of said counting devices, one of said and gates corresponding to each of the digit groups of the predetermined code respectively, each and gate producing an output when a predetermined digit group of the code contains a predetermined number of signals, and an or gate driven by the outputs of the first $n-1$ and gates with the output of said or gate preventing driving of said reset line, the output of the $n$th and gate producing the desired output indication.

8. In a station selector apparatus for producing an output indication when a predetermined code is coupled thereto as an input, the code comprising $n$ digit groups in which each digit is represented by one or more pulses, the combination of: a first counting device producing an output indicative of the number of input pulses received; a second counting device producinng an output indicative of the number of input pulses received; reset means coupled to each of said counting devices for setting to the zero condition; first circuit means for coupling a pulse representing each of the digit groups of the code to said first counting device as an input; second circuit means for cupling all of the pulses of the code to said second counting device as an input; $n$ and gates; means for coupling the outputs of each of said counting devices to each of said and gates, each of said gates providing an output signal for a predetermined combination of counts from said first and second counting devices; an or gate; and means for coupling $n-1$ of said and gates to said or gate, said or gate providing an output signal for blocking the zero setting action of said reset means.

9. In a station selector apparatus for producing an output indication when a predetermined code is coupled thereto as an input, the code comprising $n$ digit groups in which each digit is represented by one or more signals, the combination of: a first counting device producing an output indicative of the number of input signals received; a second counting device producing an output indicative of the number of input signals received; first circuit means for coupling the first signal of each of the digit groups of the code to said first counting device as an input; second circuit means for coupling said code to the second counting device as an input; third circuit means for coupling the first signal of each of the digit groups to each of said counting devices to set the counting device to the zero condition; $n$ and gates, one of said and gates corresponding to each digit group of the predetermined code; means for coupling predetermined outputs of said counting devices in parallel to said and gates as inputs; and means for coupling the outputs of the first $n-1$ and gates to said third circuit means for blocking the signal transmission of said third circuit means when any of said $n-1$ and gates provides an output signal, the output signal of the $n$th and gate being the desired output indication.

10. In a selector apparatus, the combination of: a first binary counting chain; a second binary counting chain, each binary unit of each of said chains having a pair of output terminals which alternate between signal and no-signal conditions, one terminal of each pair always being the reverse of the other; a plurality of output lines; means for applying a potential to each of said output lines; means for connecting a terminal of each of said pairs of terminals to each of said output lines, the particular terminal connected to each line corresponding to a particular count of the associated chain, said connecting means including a rectifier for each connection with the rectifier conducting to change the potential of the connected line for the no-signal condition of the associated terminal; means for applying an input to said first chain; and means for applying an input to said second chain, such inputs producing said potential change on each of said lines, except when the inputs correspond to the counts of the particular terminals which are connected to the lines.

11. In a selector apparatus, the combination of: a first binary counting chain; a second binary counting chain, each binary unit of each of said chains having a pair of output terminals which alternate between signal and no-signal conditions, one terminal of each pair always being the reverse of the other; a plurality of output lines; means for applying a potential to each of said output lines; means for connecting a terminal of each of said pairs of terminals to each of said output lines, the particular terminal connected to each line corresponding to a particular count of the associated chain, said connecting means including a rectifier for each connection with the rectifier conducting to change the potential of the connected line for the no-signal condition of the associated terminal; means for applying an input to said first chain; means for applying an input to said second chain, such inputs producing said potential change on each of said lines, except when the inputs correspond to the counts of the particular terminals which are connected to the lines; a control line; means for connecting all but one of said output lines to said control line except when such potential change exists on such an output line; a reset unit for resetting both of said chains to zero except when one of said output lines is connected to said control line; means for connecting said control line to said reset unit; and means for connecting said one output line to an indicating circuit.

12. In a station selector apparatus for producing an output indication when a predetermined code is coupled thereto as an input, the code comprising $n$ digit groups in which each digit is represented by one or more signals, the combination of: a first counting device producing an output indicative of the number of input signals received; a second counting device producing an output indicative of the number of input signals received; a reset line coupled to each of said counting devices for setting to the zero condition; first circuit means for coupling a signal representing each of the digit groups of the code to said first counting device as an input; second circuit means for coupling the code to said second counting device as an input; and reset means for driving said reset line to reset each of said counting devices to zero after receipt of each digit group of a code except when the predetermined code is coupled to said counting devices, said reset means including $n$ voltage adding circuits driven by the outputs of said counting devices, one of said adding circuits corresponding to each of the digit groups of the predetermined code, respectively, each adding circuit producing an output when a predetermined digit group of the code contains a predetermined number of signals, and an or gate driven by the outputs of the first $n-1$ adding circuits with the output of said or gate preventing driving of said reset line, the output of the $n$th adding circuit producing the desired output indication.

13. In a station selector apparatus for producing an output indication when a predetermined code is coupled thereto as an input, the code comprising $n$ digit groups in which each digit is represented by one or more pulses, the combination of: a first counting device producing an output indicative of the number of input pulses received; a second counting device producing an output indicative of the number of input pulses received; reset means coupled to each of said counting devices for setting to the zero condition; first circuit means for coupling a pulse representing each of the digit groups of the code to said first counting device as an input; second circuit means for coupling all of the pulses of the code to said second counting device as an input; $n$ voltage adding circuits; means for coupling predetermined outputs of said counting devices in parallel to said adding circuits as inputs, each of said adding circuits providing an output signal for a predetermined combination of counts from said first and second counting devices; an or gate; and means for coupling $n-1$ of said adding circuits to said or gate, said or gate providing an output signal for blocking the zero setting action of said reset means.

14. In a selector apparatus, the combination of: a first binary counting chain; a second binary counting chain, each binary unit of each of said chains having a pair of output terminals which alternate between signal and no-signal conditions, one terminal of each pair always being the reverse of the other; a plurality of output lines; means for connecting a terminal of each of said pairs of terminals to each of said output lines, the particular terminal connected to each line corresponding to a particular count of the associated chain, said connecting means including a series resistance for each connection with the resistances connected to each output line serving as a voltage divider between the signal and no-signal conditions of the connected output terminals to change the potential of the connected lines for the particular combination of signal and no-signal conditions existing at any given time; means for applying an input to said first chain; and means for applying an input to said second chain.

15. In a selector apparatus, the combination of: a first binary counting chain; a second binary counting chain, each binary unit of each of said chains having a pair of output terminals which alternate between signal and no-signal conditions, one terminal of each pair always being the reverse of the other; a plurality of output lines; means for connecting a terminal of each of said pairs of terminals to each of said output lines, the particular terminal connected to each line corresponding to a particular count of the associated chain, said connecting means including a series resistance for each connection with the resistances connected to each output line serving as a voltage divider between the signal and no-signal conditions of the connected output terminals to change the potential of the connected lines for the particular combination of signal and no-signal conditions existing at any given time; means for applying an input to said first chain; means for applying an input to said second chain; a control line; means for connecting any except one of said output lines to said control line when all of the terminals connected to such output line are in the signal condition; a reset unit for resetting both of said chains to zero except when one of said output lines is connected to said control line; means for connecting said control line to said reset unit; and means for connecting said one output line to an indicating circuit.

16. In a selector apparatus for operation from a series of groups of tone changes, the combination of: an input circuit for producing a series of groups of pulses corresponding to the tone changes of the input; a digit generator circuit for producing a series of pulses corresponding to each of the groups; a digit counter for counting the pulse output of said digit generator circuit; a number counter for counting the pulse output of said input circuit; means for coupling said pulse output of said digit generator circuit to said digit counter; means for coupling said pulse output of said input circuit to said number counter; a plurality of means for combining the outputs of said digit and number counters to produce a control signal when a predetermined series of predetermined groups is used as an input; and means for resetting each of said counters to the zero condition on receipt of a group of tone changes except when a control signal has been produced with the preceding group.

17. In a selector apparatus for operation with a code having a series of groups of code signals, the combination of: group means for producing a series of group signals corresponding to each of the groups of the code; first signal counting means, second signal counting means; means for coupling the code to said first signal counting means as an input for counting code signals consecutively; means for coupling the series of signals from said group means to said second signal counting means as an input for counting group signals consecutively; a counter output circuit for producing an output signal after termination of each group, whenever said first and second signal counting means have counted to any one of a series of predetermined number combinations, with the series of predetermined number combinations corresponding to the item to be selected; means for coupling the outputs of said counting means to said counter output circuit in parallel; a reset circuit for coupling said signals of said group means to both of said counting means for resetting said counting means to the zero condition in the absence of an output signal from said counter output circuit; and means for coupling the output of said counter output circuit to said reset circuit.

References Cited in the file of this patent

UNITED STATES PATENTS

| | | |
|---|---|---|
| 2,063,354 | Thorp | Dec. 8, 1936 |
| 2,478,361 | Bartelink | Aug. 9, 1949 |
| 2,480,624 | Barnard et al. | Aug. 30, 1949 |
| 2,563,127 | McGoffin | Aug. 7, 1951 |
| 2,564,062 | Herrick | Aug. 14, 1951 |
| 2,577,283 | Stamper | Dec. 4, 1951 |
| 2,648,831 | Vroom | Aug. 11, 1953 |
| 2,680,240 | Greenfield | June 1, 1954 |
| 2,735,082 | Goldberg | Feb. 14, 1956 |
| 2,739,301 | Greenfield | Mar. 20, 1956 |
| 2,779,933 | Bradburd | Jan. 29, 1957 |
| 2,840,726 | Hamilton | June 24, 1958 |
| 2,842,682 | Clapper | July 8, 1958 |
| 2,989,730 | Brosh | June 20, 1961 |

UNITED STATES PATENT OFFICE

CERTIFICATE OF CORRECTION

Patent No. 3,046,526

July 24, 1962

John R. Scantlin

It is hereby certified that error appears in the above numbered patent requiring correction and that the said Letters Patent should read as corrected below.

Column 6, line 17, for "end" read -- and --; column 8, line 40, for "connetced" read -- connected --; column 11, line 31, for "producinng" read -- producing --; line 37, for "cupling" read -- coupling --; column 14, line 22, for "means," read -- means; --.

Signed and sealed this 18th day of December 1962.

(SEAL)
Attest:

ERNEST W. SWIDER
Attesting Officer

DAVID L. LADD
Commissioner of Patents